United States Patent
Lee et al.

(10) Patent No.: US 11,024,929 B2
(45) Date of Patent: Jun. 1, 2021

(54) BATTERY PACK INCLUDING RELEASE COVER

(71) Applicant: LG CHEM, LTD., Seoul (KR)

(72) Inventors: Bum Jick Lee, Daejeon (KR); Youngsu Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 62 days.

(21) Appl. No.: 16/676,837

(22) Filed: Nov. 7, 2019

(65) Prior Publication Data

US 2020/0127271 A1 Apr. 23, 2020

Related U.S. Application Data

(63) Continuation of application No. PCT/KR2018/016502, filed on Dec. 21, 2018.

(30) Foreign Application Priority Data

Jan. 9, 2018 (KR) .................. 10-2018-0002876

(51) Int. Cl.
*H01M 50/572* (2021.01)
*H01M 10/42* (2006.01)
*H01M 50/166* (2021.01)

(52) U.S. Cl.
CPC ....... *H01M 50/572* (2021.01); *H01M 10/425* (2013.01); *H01M 50/166* (2021.01)

(58) Field of Classification Search
CPC ............. H01M 50/572; H01M 50/166; H01M 10/425; H01M 50/147; H01M 50/116;
(Continued)

(56) References Cited

U.S. PATENT DOCUMENTS 5,342,850 A 8/1994 Ohnota et al.
7,541,771 B1 6/2009 Leavitt et al.
(Continued)

FOREIGN PATENT DOCUMENTS

CN 202495540 U 10/2012
EP 2744017 A2 6/2014
(Continued)

OTHER PUBLICATIONS

Extended European Search Report for European Application No. 18899070.9, dated Jun. 30, 2020.
(Continued)

*Primary Examiner* — Stewart A Fraser
(74) *Attorney, Agent, or Firm* — Birch, Stewart, Kolasch & Birch, LLP

(57) ABSTRACT

A battery pack including: a battery cell provided with electrode terminals formed on one surface thereof and including a sealing surplus portion; a release cover having a label portion attached onto the one surface of the battery cell and displaying information; and a protection circuit module assembly connected to the battery cell through the electrode terminals, wherein the protection circuit module assembly may include: a protection circuit substrate electrically connected to the electrode terminals; an external input/output terminal formed on the protection circuit substrate; and an insulation member positioned between the protection circuit substrate and the battery cell, and wherein the release cover may be formed to enclose the protection circuit module assembly seated on the sealing surplus portion.

15 Claims, 5 Drawing Sheets

(58) Field of Classification Search
CPC ... H01M 50/20; H01M 50/209; H01M 50/598
See application file for complete search history.

(56) References Cited

U.S. PATENT DOCUMENTS

| | | |
|---|---|---|
| 8,092,937 B2 | 1/2012 | Hatta et al. |
| 9,263,712 B2 | 2/2016 | Choi et al. |
| 9,871,274 B2 | 1/2018 | Park et al. |
| 2009/0246621 A1 | 10/2009 | Miebori |
| 2014/0147707 A1 | 5/2014 | Choi et al. |
| 2015/0064502 A1 | 3/2015 | Hong |
| 2017/0012252 A1 | 1/2017 | Yoo et al. |
| 2017/0033333 A1 | 2/2017 | Choi et al. |
| 2018/0134923 A1 | 5/2018 | Kurata et al. |

FOREIGN PATENT DOCUMENTS

| | | |
|---|---|---|
| EP | 3113251 A1 | 1/2017 |
| JP | 5-92960 A | 4/1993 |
| JP | 2006-73457 A | 3/2006 |
| JP | 2009-158182 A | 7/2009 |
| JP | 2009-252371 A | 10/2009 |
| JP | 2010-21029 A | 1/2010 |
| JP | 2013-114862 A | 6/2013 |
| JP | 2014-120369 A | 6/2014 |
| JP | 2014-522069 A | 8/2014 |
| JP | 2017-515264 A | 6/2017 |
| KR | 10-2013-0016086 A | 2/2013 |
| KR | 10-2015-0037392 A | 4/2015 |
| KR | 10-2015-0040444 A | 4/2015 |
| KR | 10-1511779 B1 | 4/2015 |
| KR | 10-2015-0089540 A | 8/2015 |
| KR | 10-2015-0101551 A | 9/2015 |
| KR | 10-2016-0092323 A | 8/2016 |
| KR | 10-1709563 B1 | 2/2017 |
| KR | 10-2017-0055144 A | 5/2017 |
| WO | WO 2016/017048 A1 | 2/2016 |
| WO | WO 2016/194093 A1 | 12/2016 |

OTHER PUBLICATIONS

International Search Report (PCT/ISA/210) issued in PCT/KR2018/016502, dated Apr. 4, 2019.

BATTERY PACK INCLUDING RELEASE COVER

CROSS-REFERENCE TO RELATED APPLICATION

This application is a By-Pass Continuation of PCT International Application No. PCT/KR2018/016502 filed Dec. 21, 2018, and which claims priority to and the benefit of Korean Patent Application No. 10-2018-0002876 filed in the Korean Intellectual Property Office on Jan. 9, 2018, the entire contents of all being expressly incorporated herein by reference.

TECHNICAL FIELD

The present invention relates to a battery pack including a release cover.

BACKGROUND ART

In accordance with development of technology and an increasing demand for a mobile device, a demand for secondary batteries is also rapidly increasing. Among the batteries, a lithium secondary battery with high energy density and operation voltage, and excellent storage and life characteristics is widely used as an energy source for various electronic devices as well as various mobile devices.

Structures of the secondary battery may be classified into a detachable structure into and from which the battery is inserted and removed freely, and an embedded structure in which the battery is embedded in the device, depending on a type of device where the battery is used. For example, a secondary battery used in a conventional mobile device may be configured to be insertable and removable depending on a user's need, whereas a secondary battery used in devices such as some mobile phones, tablet PCs, and smart pads may be configured to be embedded.

A lithium secondary battery is widely used for the secondary battery. This secondary battery may include output terminals electrically connected to a device provided with the secondary battery, and a safety element such as a protection circuit module capable of effectively controlling abnormal states of the secondary battery such as an overcharge and/or an overcurrent situation.

Such a protection circuit module is required to keep an electric connection with electrode terminals while keeping an electric insulation from the other portions of a battery cell at the same time. Very complicated processes may thus be performed as follows: an insulating tape is attached to members including the protection circuit module; the protection circuit module is housed in a protection circuit module case; a sealing portion of a battery cell case is partially bent and the insulation tape is attached thereto; and print information is printed on a surface of the battery cell and a release paper is removed therefrom.

An assembling process of a battery pack may be very complicated due to these processes, and accordingly, a manufacturing cost may be increased. Further, when an external impact is given or imparted, the protection circuit module may be broken or dimensional stability thereof may be significantly decreased by using the insulating tape which has a low mechanical rigidity.

Accordingly, there is a need for a technique which may fundamentally solve these problems.

DISCLOSURE

Technical Problem

It is an object of the present invention to solve the above-described problems of the prior art and the technical problems in a conventional structure.

The inventors of the present application have conducted intensive research and various experiments to accomplish the present invention in which a release cover (for instance, a release paper cover) may be used to form a structure enclosing a protection circuit module assembly, and the release cover thus may replace a plurality of components, so that it is confirmed the manufacturing cost is saved and a manufacturing process is simplified.

Technical Solution

An exemplary embodiment of the present invention provides a battery pack including: a battery cell provided with electrode terminals formed on one surface thereof and including a sealing surplus portion; a release cover having a label portion attached onto the one surface of the battery cell and displaying information; and a protection circuit module assembly connected to the battery cell through the electrode terminals.

The protection circuit module assembly may include: a protection circuit substrate electrically connected to the electrode terminals; an external input/output terminal formed on the protection circuit substrate; and an insulation member positioned between the protection circuit substrate and the battery cell.

The release cover may enclose the protection circuit module assembly seated on the sealing surplus portion.

The release cover may further include: a rear cover connected to the label portion and positioned on a rear surface of the protection circuit module assembly; a top cover connected to the rear cover and positioned on a top surface of the protection circuit module assembly; a front cover connected to the top cover and positioned on a front surface of the protection circuit module assembly; and side covers connected to the rear cover and positioned on side surfaces of the protection circuit module assembly, respectively.

The side covers may further include side cover extension portions, and the side cover extension portions may be attached to the front cover, respectively.

The top cover may include an opening, and the external input/output terminal may protrude outwardly through the opening.

The front cover may have a cutout portion extending from the opening.

A front cover extension portion extending from the front cover may be attached onto the front surface of the battery cell.

The rear cover, the top cover, the front cover, and the side covers may be formed of a release layer.

The release cover may further include release layers on the top cover, the front cover and the side covers.

The release cover may further include a release layer formed only on the front cover.

The release layer may be formed of one selected from the group consisting of paper, rubber, polyethylene terephthalate and polyimide, or a mixture thereof or a mixed layer thereof.

The label portion may include an information display layer and an adhesion layer, and the information display layer may be formed of one of polyethylene terephthalate and polyimide or a mixture thereof or a mixed layer thereof.

The release layer may have a thickness of 0.1 to 0.3 mm.

The label portion may have a thickness of 0.01 to 0.05 mm. The label portion may have a desired thickness of 0.03 mm.

The battery cell may include: a housing portion in which an electrode assembly is embedded and sealing portions formed by thermal fusion on an outer circumferential surface of the housing portion, opposite side sealing portions of the sealing portions being bent with respect to positions of the electrode terminals, respectively.

The opposite side sealing portions may be bent at least once inwardly to the battery cell to be in close contact with the housing portion.

A method of manufacturing a battery pack according to the present invention may include: building an electrode assembly in a housing portion of a battery case and forming sealing portions of a battery cell by thermal fusion on an outer circumferential surface of the housing portion; connecting a protection circuit module assembly to the electrode assembly of the battery cell and seating the protection circuit module assembly onto a sealing surplus portion; enclosing the protection circuit module assembly seated on the sealing surplus portion by a release cover; bending opposite side sealing portions adjacent to a sealing portion on which the electrode terminals are formed; and removing a release layer attached onto a label portion of the release cover and attaching the label portion onto a surface of the battery cell.

The method may further include enclosing side surfaces of the protection circuit module assembly by side covers of the release cover and attaching the side covers to the front cover, respectively.

A device according to an embodiment of the present invention includes the above-described battery pack as a power supply. For example, the device may be an electronic device such as a mobile phone, a notebook, a smart pad and a camcorder, or an energy source provided in a bicycle with battery mount, an electric vehicle, and a hybrid vehicle.

MODE FOR INVENTION

Hereinafter, the present invention is described in detail with reference to the drawings according to the embodiments of the present invention, but the scope of the present invention is not limited thereto.

Figure 1:
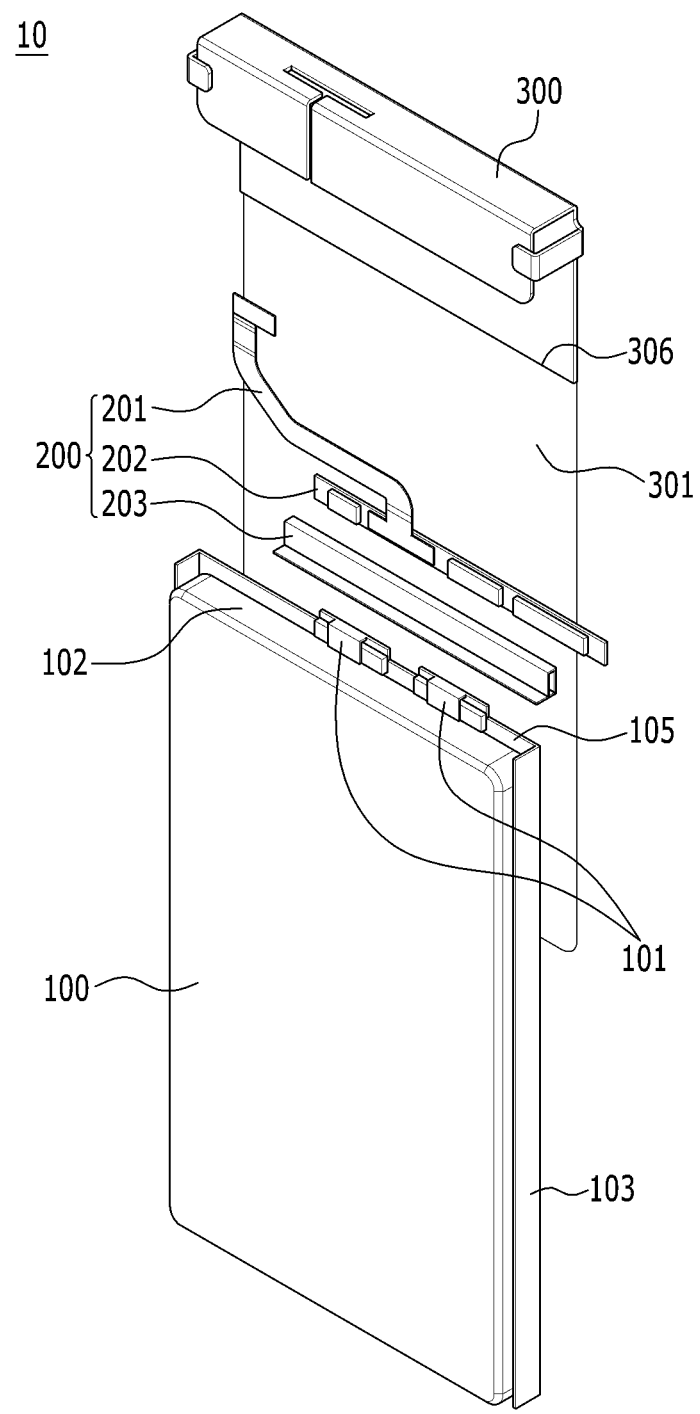
FIG. 1 is an exploded perspective view illustrating a battery pack according to an embodiment of the present invention.

FIG. 1 is an exploded perspective view illustrating a battery pack according to an embodiment of the present invention.

Referring to FIG. 1, a battery pack 10 may include a battery cell 100, a protection circuit module assembly 200 and a release cover (or a release paper cover or a release sheet cover) 300. The battery cell 100 may be provided with electrode terminals 101 formed on one surface thereof and including a sealing surplus portion 102. The protection circuit module assembly 200 may include: a protection circuit substrate 202 electrically connected to the battery cell 100 through the electrode terminals 101 of the battery cell 100; an external input/output terminal 201 formed on the protection circuit substrate 202; and an insulation member 203 positioned between the protection circuit substrate 202 and the battery cell 100. As described below, the release cover 300 may enclose the protection circuit module assembly 200 seated on the sealing surplus portion 102 of the battery cell 100.

Figure 2:
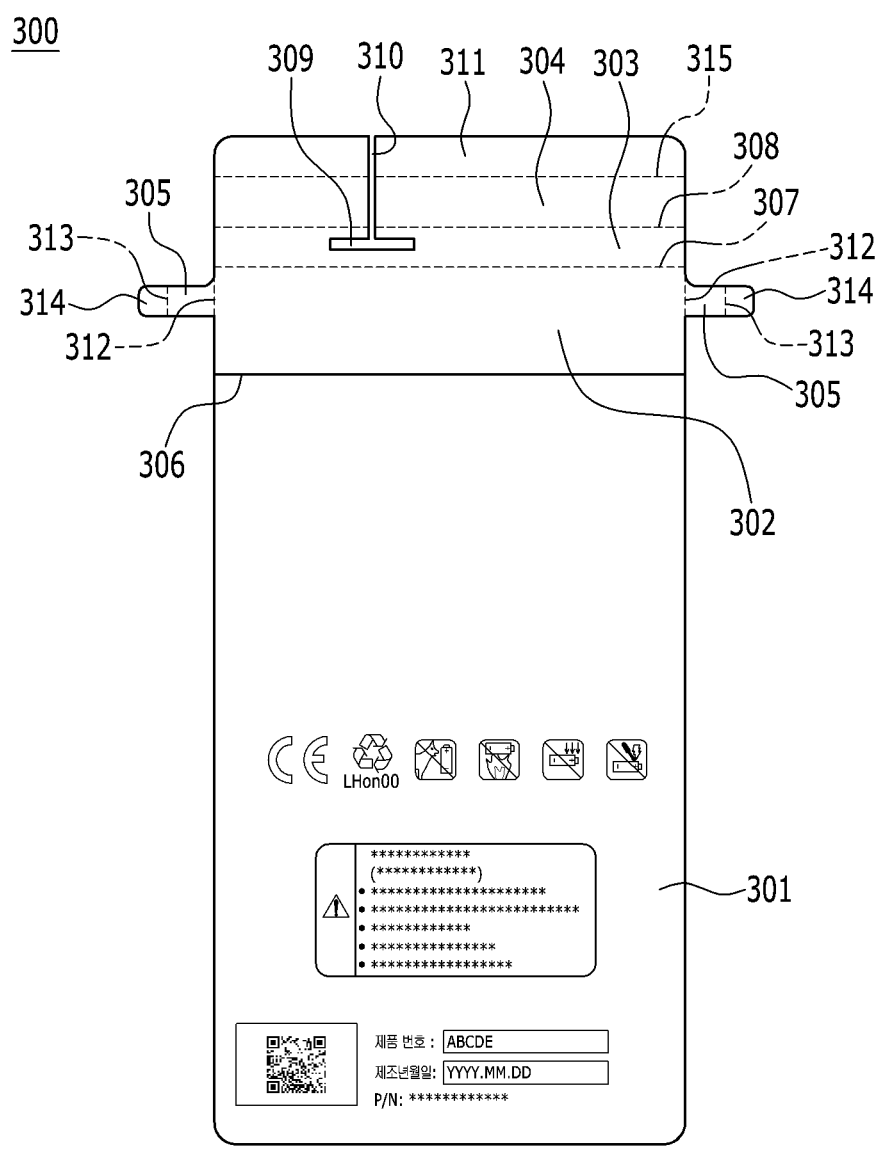
FIG. 2 is a plan view illustrating a release cover of FIG. 1 that is spread on the same plane.

FIG. 2 is a plan view illustrating a release cover of FIG. 1 that is spread on the same plane.

Referring to FIGS. 1 and 2, the release cover 300 may include a label portion 301, a rear cover 302, a top cover 303, a front cover 304, and side covers 305. The label portion 301 may be attached onto a surface of the battery cell 100 and display relevant information. The rear cover 302 may be connected to the label portion 301 and positioned on a rear surface of the protection circuit module assembly 200. The top cover 303 may be connected to the rear cover 302 and positioned on a top surface of the protection circuit module assembly 200. The front cover 304 may be connected to the top cover 303 and positioned on a front surface of the protection circuit module assembly 200. The side covers 305 may be connected to the rear cover 302 and positioned on side surfaces of the protection circuit module assembly 200, respectively.

The label portion 301 and the rear cover 302 may be distinguished from each other with a boundary of a release layer perforation line 306. A lower portion may be distinguished as the label portion 301 and an upper portion may be distinguished as the rear cover 302 with a boundary of the release layer perforation line 306.

When the label portion 301 is attached onto the surface of the battery cell 100, among release layers attached onto one entire surface of the release cover 300, a release layer of the label portion 301 may be removed therefrom along the release layer perforation line 306 and the other release layers may remain on the release cover 300 except for the label portion 310. A detailed description thereof is provided below.

A first bending line 307 may be formed between the rear cover 302 and the top cover 303. The lower portion may be the rear cover 302 and the upper portion may be the top cover 303 with a boundary of the first bending line 307. The top cover 303 may be bent perpendicular to the rear cover 302 with respect to the first bending line 307. A degree to which the top cover 303 can be bent may be variously determined depending on a shape of the protection circuit module assembly 200. An opening 309 may be formed in the top cover 303 so that the external input/output terminal 201 may protrude outwardly therefrom.

A second bending line 308 may be formed between the top cover 303 and the front cover 304. The lower portion may be the top cover 303 and the upper portion may be the front cover 304 with a boundary of the second bending line 308. The front cover 304 may be bent perpendicular to the top cover 303 with respect to the second bending line 308. A degree to which the front cover 304 can be bent may be variously determined depending on a shape of the protection circuit module assembly 200.

The front cover 304 may have a cutout portion 310 extending from the opening 309 formed in the top cover 303 in a longitudinal direction of the battery cell 100. The external input/output terminal 201 may pass through the cutout 310 to be positioned in the opening 309 when the release cover 300 encloses the protection circuit module assembly 200. The front cover 304 may further include a front cover extension portion 311 extending from the front cover 304.

The side covers 305 may be formed on opposite sides of the rear cover 302 respectively corresponding to opposite end portions of the battery cell 100 in a width direction. Third bending lines 312 may be formed between the side covers 305 and the rear cover 302, respectively, and the side covers 305 may be bent perpendicular to the rear cover 302 with respect to the third bending lines 312, respectively. A degree to which the side cover 305 can be bent may be variously determined depending on a shape of the protection circuit module assembly 200. The side covers 305 may further include fourth bending lines 313, respectively.

Figure 3:
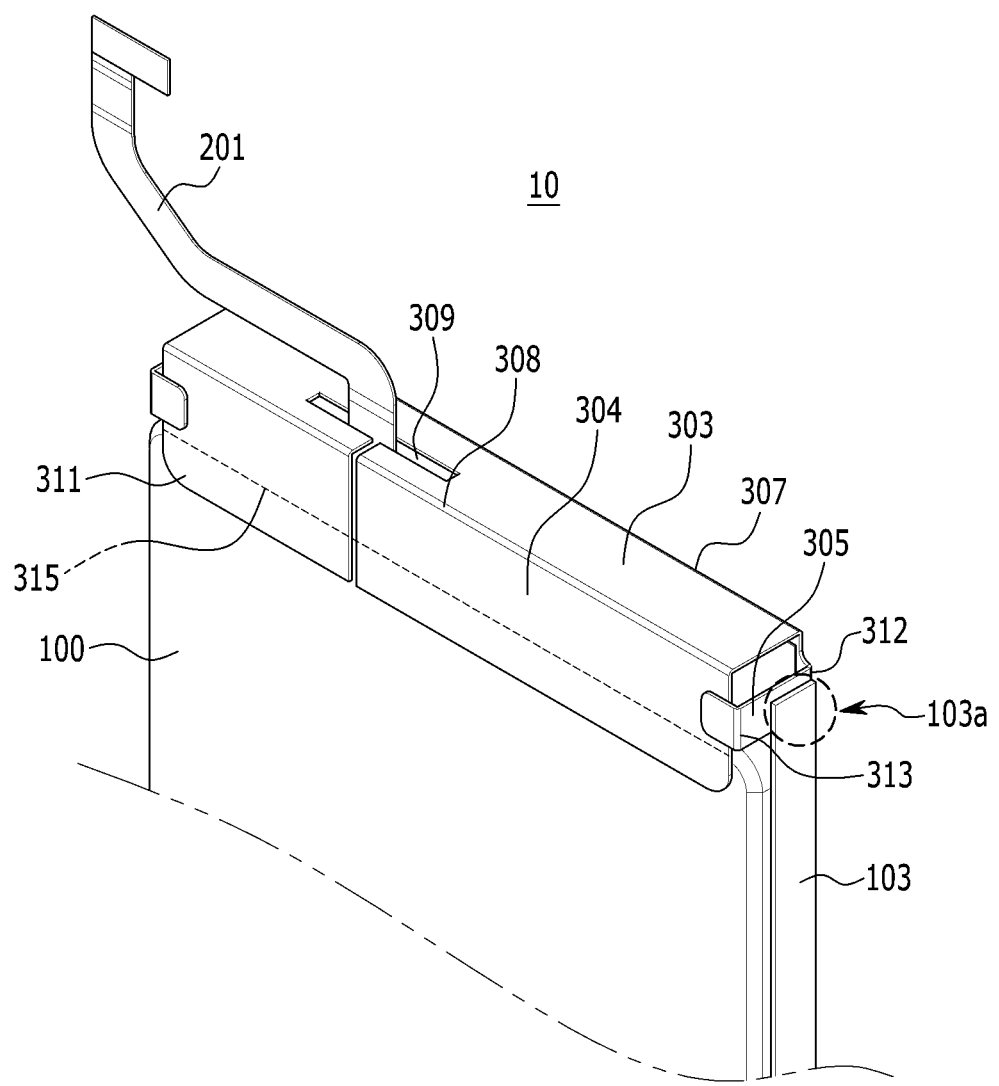
FIG. 3 is a perspective view illustrating a battery pack in which the release cover of FIG. 2 encloses a protection circuit module assembly.

FIG. 3 is a perspective view illustrating a battery pack in which the release cover of FIG. 2 encloses a protection circuit module assembly.

Referring to FIGS. 1 to 3, the release cover 300 may enclose the protection circuit module assembly 200 seated on the sealing surplus portion 102 of the battery cell 100.

The top cover 303 may be bent perpendicular to the rear cover 302 with respect to the first bending line 307. The front cover 304 may be bent perpendicular to the top cover 303 with respect to the second bending line 308. The front cover extension portion 311 extending from the front cover 304 may be applied with an adhesive to be attached onto a front surface of the battery cell 100. Here, the front surface of the battery cell 100 may refer to a surface opposite to one surface of the battery cell 100 on which the label portion 301 may be formed. The front cover 304 and the front cover extension portion 311 may be distinguished from each other with respect to a borderline 315.

The side covers 305 may be bent perpendicular to the rear cover 302 with respect to the third bending lines 312, respectively. The side covers 305 may further include side cover extension portions 314, and the side cover extension portions 314 may be bent in perpendicular with respect to the side covers 305 at the fourth bending lines 313, respectively. The side cover extension portions 314 bent in perpendicular at the fourth bending lines 313 may be applied with an adhesive to be attached onto the front cover 304.

As a modified example, an adhesive may be additionally applied to an entire or a part of the release cover 300 except for the label portion 301, so that the release cover 300 may more tightly enclose the protection circuit module assembly 200.

In addition, the external input/output terminal 201 may protrude outwardly through the opening 309 of the top cover 303.

Due to such a structure, the protection circuit module assembly 200 seated on the sealing surplus portion 102 of the battery cell 100 may be firmly fixed thereto, while being insulated therefrom by the release cover 300. That is, since the battery pack 10 according to the present invention does not require a separate protection circuit module assembly case or an insulating tape, a manufacturing cost may be reduced. Further, since the label portion 301 of the release cover 300 may be attached onto the surface of the battery cell 100 and simultaneously enclose the protection circuit module assembly 200, a manufacturing process thereof may be simplified.

The release cover 300 may be formed of the release layer, except for the label portion 301. The release layer may not be particularly limited in terms of a material as long as the material has a predetermined strength and an insulating property, and may be formed of one of polyethylene terephthalate and polyimide or a mixture thereof, or a mixed layer thereof. In embodiments of the present invention, a mixture can refer to a single sheet or layer that includes materials in a homogeneous or amalgamated manner, and a mixed layer can refer to a collection of different sheets of materials in stacked or laminated manner.

The release layers may have a thickness of 0.1 to 0.3 mm. Here, in a case where the thickness is 0.1 mm or less, the manufacturing cost may be reduced, however, the protection circuit module assembly 200 may be difficult to be protected from the external impact. In a case where the thickness is 0.3 mm or more, the manufacturing cost may be increased and a volume of a product may be increased. Neither case is preferable or desired.

For example, the release layer of the release cover 300 may have a thickness of 0.2 mm and may be formed of polyimide. In a case where the release layer is formed of a polyimide, the release layer may maintain sufficient strength even when having a thin thickness of 0.2 mm, and accordingly, protect the protection circuit module assembly from the external impact. In addition, the manufacturing cost may be reduced, a total volume of the battery pack may be reduced, and a capacity of the battery cell may be increased by a reduced volume. The label portion 301 may have a thickness of 0.01 to 0.05 mm, and for example 0.03 mm.

The label portion 301 may include an adhesion layer and an information display layer. The information display layer may include information to be displayed on the surface of the battery cell 100. The release layer may be attached onto one surface of the adhesion layer, however, this release layer may be removed therefrom when the same surface of the adhesion layer is attached onto the surface of the battery cell 100. The information display layer may be formed on the other surface opposite to one surface of the adhesion layer.

Referring to FIGS. 1 and 3, the battery cell 100 may include: a housing portion in which an electrode assembly is embedded and sealing portions 105 formed by thermal fusion on an outer circumferential surface of the housing portion, opposite side sealing portions 103 of the sealing portions 105 being bent with respect to positions of the electrode terminals 101, respectively. The opposite side sealing portions 103 may be bent at least once to be in close contact with the housing portion in order to cover a side surface of the battery cell 100. As illustrated in FIG. 3, sealing portions 103a formed on portions where the opposite side sealing portions 103 and the sealing portion onto which the electrode terminals 101 are positioned meet each other, respectively, may extend in a direction in which the sealing surplus portion 102 may be formed to support the protection circuit module assembly 200.

Referring to FIGS. 1 to 3, a method of manufacturing a battery pack according to the present invention is described as below.

First, an electrode assembly may be embedded in a housing portion of a battery case and sealing portions 105 may be formed by thermal fusion on an outer circumferential surface of the housing portion. A protection circuit module assembly 200 may be connected to the electrode assembly 101 of the battery cell 100, and the protection circuit module assembly 200 may be seated on a sealing surplus portion 102 of the battery cell 100. A release cover 300 may then enclose the protection circuit module assembly 200 seated on the sealing surplus portion 102. Here, a front cover extension portion 311 of the release cover 300 may be attached and fixed onto a surface of the battery cell 100. Side cover extension portions 314 of side covers 305 may also be attached and fixed to the front cover 304. Opposite side sealing portions 103 adjacent to the sealing portion 105 on which the electrode terminals 101 are formed may be bent to be in close contact with the housing portion of the battery case. The release layer attached onto a label portion 301 of the release cover 300 may be removed along a release layer perforation line 306 of FIG. 2, and the label portion 301 may be attached onto the surface of the battery cell 100. In this way, the battery pack 10 may be manufactured.

Figure 4:
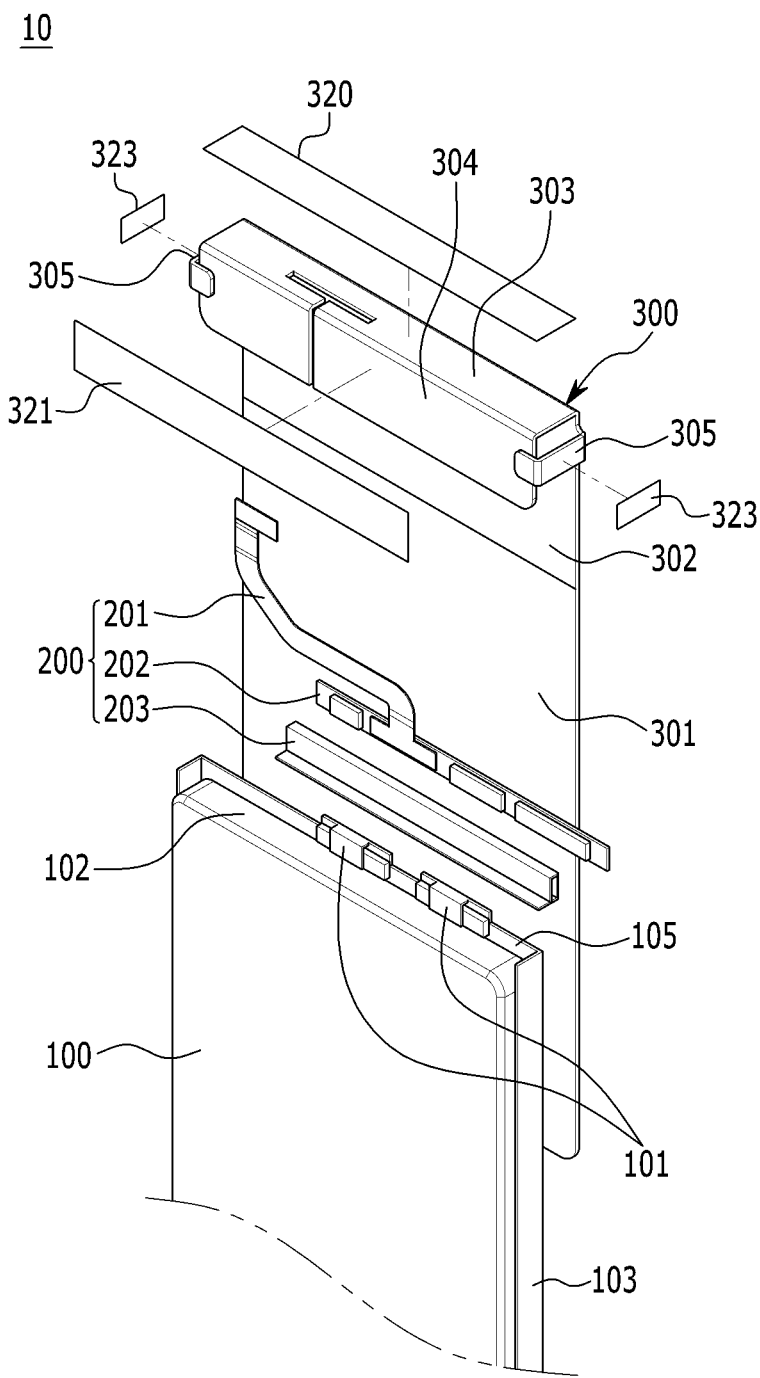
FIG. 4 is an exploded perspective view illustrating a battery pack according to another embodiment of the present invention.

FIG. 4 is an exploded perspective view illustrating a battery pack according to another embodiment of the present invention.

Referring to FIG. 4, a battery pack 10 may include a battery cell 100, a protection circuit module assembly 200 and a release cover 300. The battery cell 100 may be provided with electrode terminals 101 formed on one surface thereof and including a sealing surplus portion 102. The protection circuit module assembly 200 may include: a protection circuit substrate 202 electrically connected to the battery cell 100 through the electrode terminals 101 of the battery cell 100; an external input/output terminal 201 formed on the protection circuit substrate 202; and an insulation member 203 positioned between the protection circuit substrate 202 and the battery cell 100. The release cover 300 may enclose the protection circuit module assembly 200 seated on the sealing surplus portion 102 of the battery cell 100.

The release cover 300 may include a label portion 301, a rear cover 302, a top cover 303, a front cover 304, and side covers 305. The rear cover 302 may be connected to the label portion 301 and positioned on a rear surface of the protection circuit module assembly 200. The top cover 303 may be connected to the rear cover 302 and positioned on a top surface of the protection circuit module assembly 200. The front cover 304 may be connected to the top cover 303 and positioned on a front surface of the protection circuit module assembly 200. The side covers 305 may be connected to the rear cover 302 and positioned on side surfaces of the protection circuit module assembly 200, respectively.

The release cover 300 may further include release layers 320, 321 and 323 formed on the top cover 303, the front cover 304 and the side covers 305, respectively.

The release layers 320, 321 and 323 may be formed of, for example, one of paper, rubber, polyethylene terephthalate and polyimide, or a mixture thereof or a mixed layer thereof. Other materials in the form of a sheet or a layer can be used for the release layers 320, 321 and 323, for example. These release layers 320, 321 and 323 may absorb external impact and thereby, protect the protection circuit module assembly 200 from the external impact.

The release layers 320, 321 and 323 may have a thickness of 0.1 to 0.3 mm. Here, in a case where the thickness is 0.1 mm or less, the manufacturing cost may be reduced, however, the protection circuit module assembly 200 may be difficult to be protected from the external impact. In a case where the thickness is 0.3 mm or more, the manufacturing cost may be increased and a volume of a product may be increased. Neither case is preferable or desired.

The label portion 301 may include an information display layer and an adhesion layer, and the information display layer may be formed of one of polyethylene terephthalate and polyimide or a mixture thereof or a mixed layer thereof.

The label portion 301 may have a thickness of 0.01 to 0.05 mm, and for example 0.03 mm.

Figure 5:
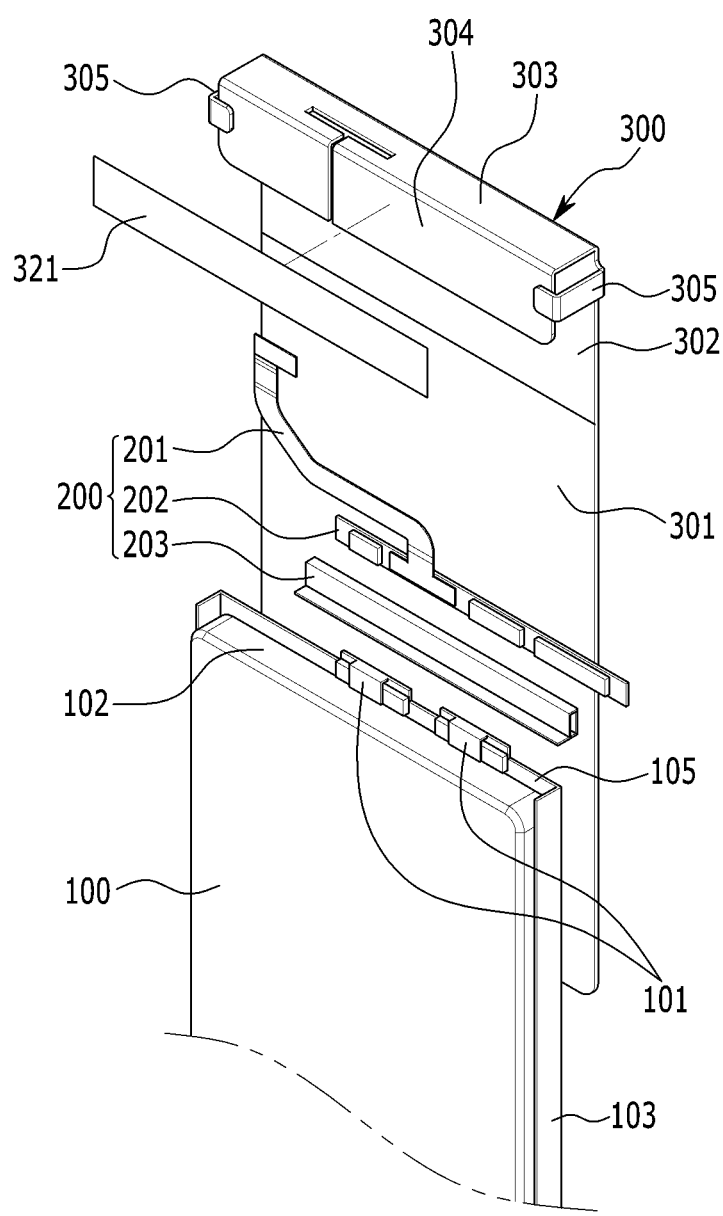
FIG. 5 is an exploded perspective view illustrating a release layer that is formed only on a front cover of the battery pack of FIG. 4.

FIG. 5 is an exploded perspective view illustrating a release layer that is formed only on a front cover of the battery pack of FIG. 4.

Referring to FIG. 5, a release layer 321 may be formed only on the front cover 304.

Those skilled in the art will appreciate that various modifications, additions and substitutions are possible, without departing from the scope and spirit of the invention as disclosed in the accompanying claims.

INDUSTRIAL APPLICABILITY

As described above, in the battery pack according to the present invention, the protection circuit module assembly is enclosed using the release cover, such that the release cover may replace a plurality of components. The manufacturing costs may thus be reduced and the manufacturing process may be simplified.

The invention claimed is:

1. A battery pack comprising:
    a battery cell provided with electrode terminals formed on one surface thereof and including a sealing surplus portion;
    a release cover including a label portion attached onto the one surface of the battery cell and displaying information; and
    a protection circuit module assembly connected to the battery cell through the electrode terminals,
    wherein the protection circuit module assembly includes:
    a protection circuit substrate electrically connected to the electrode terminals;
    an external input/output terminal formed on the protection circuit substrate; and
    an insulation member positioned between the protection circuit substrate and the battery cell, and
    wherein the release cover encloses the protection circuit module assembly seated on the sealing surplus portion.

2. The battery pack of claim 1, wherein the release cover further includes:
    a rear cover connected to the label portion and positioned on a rear surface of the protection circuit module assembly;
    a top cover connected to the rear cover and positioned on a top surface of the protection circuit module assembly;
    a front cover connected to the top cover and positioned on a front surface of the protection circuit module assembly; and
    side covers connected to the rear cover and positioned on side surfaces of the protection circuit module assembly, respectively.

3. The battery pack of claim 2, wherein the side covers further include side cover extension portions, and the side cover extension portions are attached to the front cover, respectively.

4. The battery pack of claim 2, wherein the top cover includes an opening, and the external input/output terminal protrudes outwardly through the opening.

5. The battery pack of claim 4, wherein the front cover has a cutout portion extending from the opening.

6. The battery pack of claim 2, wherein a front cover extension portion extending from the front cover is attached onto the front surface of the battery cell.

7. The battery pack of claim 2, wherein the rear cover, the top cover, the front cover, and the side covers are formed of a release layer.

8. The battery pack of claim 7, wherein the release layer is formed of one selected from the group consisting of paper, rubber, polyethylene terephthalate and polyimide, or a mixture thereof or a mixed layer thereof.

9. The battery pack of claim 7, wherein the release layer has a thickness of 0.1 to 0.3 mm.

10. The battery pack of claim 2, wherein the release cover further includes release layers on the top cover, the front cover, and the side covers.

11. The battery pack of claim 2, wherein the release cover further includes a release layer formed only on the front cover.

12. The battery pack of claim 1, wherein the label portion includes an information display layer and an adhesion layer, and the information display layer is formed of one of polyethylene terephthalate and polyimide or a mixture thereof or a mixed layer thereof.

13. The battery pack of claim 1, wherein the label portion has a thickness of 0.01 to 0.05 mm.

14. The battery pack of claim 1, wherein the battery cell includes:
- a housing portion in which an electrode assembly is embedded; and
- sealing portions formed by thermal fusion on an outer circumferential surface of the housing portion,
- wherein opposite side sealing portions of the sealing portions is bent with respect to positions of the electrode terminals, respectively, and the opposite side sealing portions is bent at least once inwardly to the battery cell to be in close contact with the housing portion.

15. A device comprising the battery pack of claim 1 as a power supply.

* * * * *